UNITED STATES PATENT OFFICE.

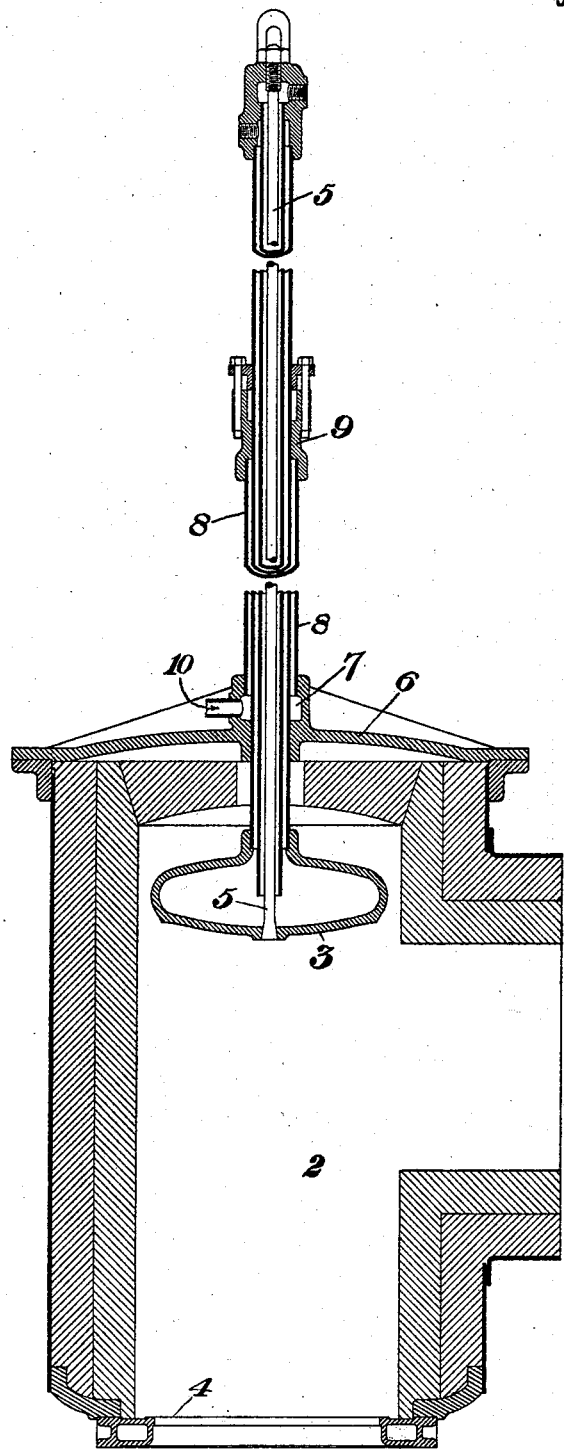

JULIAN KENNEDY, OF PITTSBURG, PENNSYLVANIA.

HOT-BLAST VALVE.

SPECIFICATION forming part of Letters Patent No. 539,182, dated May 14, 1895.

Application filed January 7, 1895. Serial No. 534,038. (No model.)

*To all whom it may concern:*

Be it known that I, JULIAN KENNEDY, of Pittsburg, in the county of Allegheny and State of Pennsylvania, have invented a new and useful Improvement in Hot-Blast Valves, of which the following is a full, clear, and exact description, reference being had to the accompanying drawing, which represents a vertical section of a valve whose stem is provided with my improved seal.

My invention relates to the prevention of the escape of the blast around the stems of valves used in blast conduits, and it consists in maintaining about the exterior portion of the valve-stem a pressure which opposes that within the casing and prevents escape of the blast around the stem. In the movement of these hot-blast valves, the fine dust or ash which settles upon the stem cuts away the stem packing and allows the blast to blow out around the stem, causing considerable waste.

In my improved construction, the packing proper is above any point to which the dust-coated portion of the stem can reach, and hence is never cut away by this dust or ash, and between this packing and the cover-plate of the valve-casing a pressure is maintained from an exterior source.

In the drawing, 2 represents the valve-casing, 3 the water-cooled valve, and 4 its seat. The water-cooled stem 5 of the valve extends through the cover-plate 6 and through a chamber 7 therein. Secured to the plate 6 and extending into the chamber 7, is a pipe 8 surrounding the stem 5 of the valve, and provided at its upper end with a suitable packing 9. The pipe 8 is of such length that in lifting the valve from its seat the dust-coated part of the stem cannot reach the packing 9, which consequently remains uninjured. Into the chamber 7 leads a pipe 10 which supplies a cold-blast pressure thereto, and maintains in this chamber and the annular space between the pipe 8 and the valve-stem a pressure equal to or greater than the hot-blast pressure in the valve-chamber. Any of the hot blast tending to pass out through the cover-plate is therefore checked and held by the opposite pressure in the chamber.

The advantages of my invention will be appreciated by those skilled in the art, since the waste of the hot blast is prevented, and that by a simple, cheap and effective device.

Many changes may be made by the skilled mechanic in the form, arrangement and construction of the parts of my device without departing from my invention, since

What I claim is—

The combination with a valve casing containing a reciprocatory valve, of a pipe surrounding the exterior portion of the valve-stem, and having a packing located beyond the point to which any portion of the stem which is within the casing when the valve is closed can reach in the opening of the valve, and means for maintaining a pressure in the space between the pipe and stem; substantially as described.

In testimony whereof I have hereunto set my hand.

JULIAN KENNEDY.

Witnesses:
W. B. CORWIN,
H. M. CORWIN.